United States Patent
Fortier et al.

[11] Patent Number: 5,826,898
[45] Date of Patent: Oct. 27, 1998

[54] MODULAR STEERING HEADSET FOR USE ON A BICYCLE

[76] Inventors: Robert L. Fortier, 502 W. Blum, Alvin; Dennis Quick, 200 Dominick Park Dr., Apt. 222, Houston, both of Tex. 77511

[21] Appl. No.: 567,111

[22] Filed: Dec. 4, 1995

[51] Int. Cl.⁶ ................................................. B62K 21/18
[52] U.S. Cl. ........................ 280/279; 280/276; 74/551.1
[58] Field of Search ................................. 280/274, 279, 280/280, 276; 384/545, 560, 572, 609, 614, 538, 477; 74/551.1

[56] References Cited

U.S. PATENT DOCUMENTS

| | | | |
|---|---|---|---|
| 1,730,630 | 12/1926 | Sauer et al. | 280/279 X |
| 3,438,650 | 4/1969 | Jaulmes | 280/279 |
| 4,189,167 | 2/1980 | Dubois | 280/279 |
| 4,303,257 | 12/1981 | Perotti et al. | 280/279 |
| 4,350,360 | 9/1982 | Olsson et al. | 280/279 |
| 5,178,035 | 1/1993 | D'Aluisio | 74/551.1 |
| 5,405,202 | 4/1995 | Chi | 280/279 X |
| 5,647,684 | 7/1997 | Chen | 74/551.1 |
| 5,681,119 | 10/1997 | Marui | 384/545 |

FOREIGN PATENT DOCUMENTS

| | | | |
|---|---|---|---|
| 0 541 070 A1 | 5/1993 | European Pat. Off. | 280/279 |
| 28300 | 2/1925 | France | 280/279 |
| 90 | 1/1916 | United Kingdom | 280/279 |
| 297208 | 9/1928 | United Kingdom | 280/279 |

*Primary Examiner*—Kevin Hurley
*Assistant Examiner*—Gary Savitt

[57] ABSTRACT

A modular steering headset for use on a bicycle having a frame with a head tube secured thereto and a fork with a tubular upper extent, the steering headset including a pair of annular cups with each cup secured to an end of the head tube; an upper and lower pair of rigid annular raceways secured within the cups around the upper extent of the front fork to create an upper annular channel and a lower annular channel; a pair of bearing cages disposed around the upper extent of the fork and within the channels; and an adjusting nut threadably coupled to the upper end of the front fork and tightened to secure the bearing cages between adjacently located raceways, thereby rotatably coupling the fork to the head tube.

1 Claim, 3 Drawing Sheets

MODULAR STEERING HEADSET FOR USE ON A BICYCLE

BACKGROUND OF THE INVENTION

1. Field of the Invention

The present invention relates to a modular steering headset for use on a bicycle and more particularly pertains to allowing a front fork of the bicycle to be rotatably coupled to its frame, and in the process produces a type of coupling that permits smoother steering of the bicycle and increased impact strength under rough riding conditions with a modular steering headset.

2. Description of the Prior Art

The use of bicycle headsets is known in the prior art. More specifically, bicycle headsets heretofore devised and utilized for the purpose of coupling a frame of a bicycle to its front fork are known to consist basically of familiar, expected and obvious structural configurations, notwithstanding the myriad of designs encompassed by the crowded prior art which have been developed for the fulfillment of countless objectives and requirements.

By way of example, U.S. Pat. No. 448,655 to Jeffery discloses a velocipede. U.S. Pat. No. 653,642 to Darling discloses a handlebar. U.S. Pat. No. 740,703 to Seymour discloses a bicycle. U.S. Pat. No. 1,799,806 to Thomsen et al. discloses a steering post stabilizer for motorcycles. U.S. Pat. No. 2,310,064 to Conti discloses a tricycle. U.S. Pat. No. 3,123,376 to Kendall et al. discloses a vehicle steering linkage. U.S. Pat. No. 4,350,360 to Olsson et al. discloses an assembly of prefabricated bicycle components. U.S. Pat. No. 4,429,891 to Hon discloses a foldable and portable vehicle. U.S. Pat. No. 4,699,233 to Koga et al. discloses a vehicle body frame of a motor bicycle. U.S. Pat. No. 5,163,697 to Kastan discloses a bicycle shock absorbing and energy damping apparatus. U.S. Pat. No. 5,279,137 to Orvell discloses a bicycle anti-theft device.

While these devices fulfill their respective, particular objective and requirements, the aforementioned patents do not describe a modular steering headset for use on a bicycle that is simple and modular in design and further produces a type of coupling between the fork and the frame that permits smoother steering of the bicycle and increased impact strength under rough riding conditions.

In this respect, the modular steering headset for use on a bicycle according to the present invention substantially departs from the conventional concepts and designs of the prior art, and in doing so provides an apparatus primarily developed for the purpose of allowing a front fork of the bicycle to be rotatably coupled to its frame.

Therefore, it can be appreciated that there exists a continuing need for new and improved modular steering headset for use on a bicycle which can be used for allowing a front fork of the bicycle to be rotatably coupled to its frame. In this regard, the present invention substantially fulfills this need.

SUMMARY OF THE INVENTION

In the view of the foregoing disadvantages inherent in the known types of bicycle headsets now present in the prior art, the present invention provides an improved modular steering headset for use on a bicycle. As such, the general purpose of the present invention, which will be described subsequently in greater detail, is to provide a new and improved modular steering headset for use on a bicycle and method which has all the advantages of the prior art and none of the disadvantages.

To attain this, the present invention essentially comprises, in combination, a rigid metal head tube. The head tube is securable to a forward extent of the bicycle frame. The head tube has a central longitudinal axis, a circular interior cross section, an upper end with an upper opening, an upper end edge bounding the upper opening, a lower end with a lower opening, a lower end edge bounding the lower opening, and a smooth interior surface.

A rigid metal front fork is included. The front fork has a tubular upper extent and a bifurcated lower extent. The upper extent of the fork is slidably rotatably inserted within the lower end of the tube and is further terminated at a threaded upper end. The lower extent of the fork has a flat annular upper abutment edge formed thereon and a pair of spaced and downwardly extending tines that are securable to a front wheel of the bicycle.

A pair of rigid metal cups is provided. Each cup has a central axis, a tubular inboard portion with a smooth outer surface and a smooth inner surface, a tubular outboard portion of a diameter greater than that of the inboard portion and having a smooth inner surface, and an annular intermediate portion extended therebetween. Each cup has an upper extent with an L-shaped cross-section integral with a lower extent having an inverted L-shaped cross-section. One of the cups has its inboard portion fixedly press-fit into the upper opening of the head tube. The other cup has its inboard portion fixedly press-fit into the lower opening of the head tube. When this press-fit type of coupling is performed, the central axes of the cups are aligned with the central axis of the head tube. When secured in this manner, the outer surface of each inboard portion of each cup is positioned in facing contact with the inner surface of the head tube, the outer surface of each cup is positioned in facing spaced opposition to the upper extent of the front fork, and the intermediate portion of each of the cups is positioned in facing contact with the associated end edge of the head tube.

An upper pair and a lower pair of rigid metal annular raceways are included. Each raceway has a fixed inner diameter, a fixed outer diameter, a smooth planar inboard surface, a smooth planar outboard surface, a smooth planar outboard edge interconnecting the surfaces at an outer extent thereof, a smooth planar inboard edge interconnecting the surfaces at an inner extent thereof, and a circular groove with a concave cross section formed on a central portion of the inboard surface. One of the raceways of the lower pair is fixedly press-fit around the upper extent of the front fork with its outboard surface positioned in facing contact with the abutment edge. The other raceway of the lower pair is slidably disposed around the upper extent of the front fork and fixedly press-fit within the lower cup. In addition, one of the raceways of the upper pair is slidably disposed around the upper extent of the front fork and press-fit within the upper cup. The other raceway of the upper pair is slidably disposed around the upper extent of the front fork. The inboard surfaces of the upper raceways are positioned in facing opposition to create an upper annular channel therebetween. The inboard surfaces of the lower raceways are positioned in facing opposition to create a lower annular channel therebetween.

A pair of bearing cages is also included. Each bearing cage is formed of a flat rigid metal ring with a circular arrangement of rollable, rigid, and spaced metal bearings secured thereto and projecting outwards therefrom. One of the bearing cages is disposed around the upper extent of the front fork and positioned between the upper pair of raceways with its bearings positioned within the upper channel. The other bearing cage is disposed around the upper extent of the front fork and positioned between the lower pair of raceways with its bearings positioned within the lower channel.

Lastly, a rigid metal adjusting nut is included and threadably coupled to the upper end of the front fork. The nut has a tubular upper portion, a tubular lower portion that has a diameter that is greater than the upper portion, and an intermediate portion extended therebetween. The nut has an upper extent with an L-shaped cross-section integral with a lower portion having an inverted L-shaped cross-section. The nut is placed in facing contact with the outboard surface of the uppermost raceway of the upper pair and tightened to place the rings of the bearing cages in fixed contact between with the associated inboard surfaces of the raceways thereby allowing rollable movement of the bearings within the channels and rotatably coupling the front fork to the head tube.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved modular steering headset for use on a bicycle which has all the advantages of the prior art bicycle headsets and none of the disadvantages.

It is another object of the present invention to provide a new and improved modular steering headset for use on a bicycle which may be easily and efficiently manufactured and marketed.

It is a further object of the present invention to provide a new and improved modular steering headset for use on a bicycle which is of durable and reliable construction.

An even further object of the present invention is to provide a new and improved modular steering headset for use on a bicycle which is susceptible of a low cost of manufacture with regard to both materials and labor, and which accordingly is then susceptible of low prices of sale to the consuming public, thereby making such a modular steering headset for use on a bicycle economically available to the buying public.

Still yet another object of the present invention is to provide a new and improved modular steering headset for use on a bicycle which provides in the apparatuses and methods of the prior art some of the advantages thereof, while simultaneously overcoming some of the disadvantages normally associated therewith.

Even still another object of the present invention is to provide a new and improved modular steering headset for use on a bicycle for allowing a front fork of the bicycle to be rotatably coupled to its frame and in the process produces a type of coupling that permits smoother steering of the bicycle and increased impact strength under rough riding conditions.

Lastly, it is an object of the present invention to provide a new and improved modular steering headset for use on a bicycle having a frame with a head tube secured thereto and a fork with a tubular upper extent, steering headset comprising a pair of rigid annular cups with each cup secured to an end of the head tube and aligned therewith; an upper pair and a lower pair of rigid annular raceways, wherein one of the raceways of the lower pair is secured around the upper extent of the front fork and the other raceway of the lower pair is slidably disposed around the upper extent of the fork and secured within the lower cup, and wherein one of the raceways of the upper pair is slidably disposed around the upper extent of the fork and secured within the upper cup and the other raceway of the upper pair is slidably disposed around the upper extent of the fork, and wherein the raceways of the upper pair are positioned in facing opposition to create an upper annular channel therebetween and the lower raceways are positioned in facing opposition to create a lower annular channel therebetween; a pair of bearing cages, each bearing cage formed of a rigid ring with an arrangement of rollable rigid bearings secured thereto and with one of the bearing cages disposed around the upper extent of the fork and positioned between the upper pair of raceways with its bearings positioned within the upper channel, and with the other bearing cage disposed around the upper extent of the fork and positioned between the lower pair of raceways with its bearings positioned within the lower channel; and a rigid adjusting nut threadably coupled to the upper end of the front fork and tightened to place the rings of the bearing cages in fixed contact between the associated raceways, thereby allowing rollable movement of the bearings within the channels and rotatably coupling the fork to the head tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
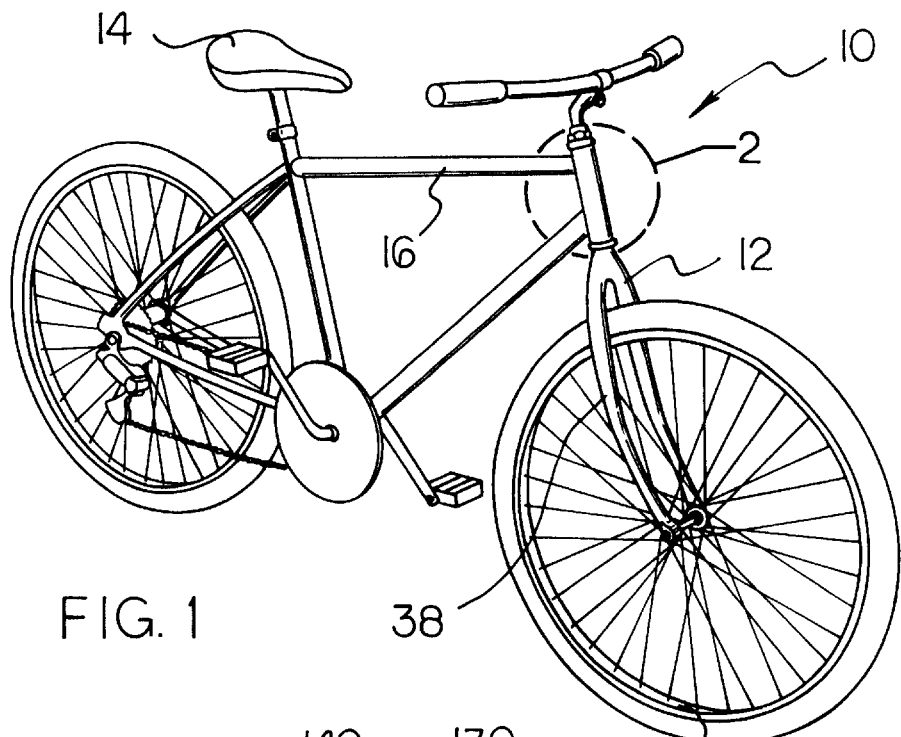
FIG. 1 is a perspective view of the preferred embodiment constructed in accordance with the principles of the present invention secured between a frame and a fork of a bicycle.

With reference now to the drawings, and in particular, to FIG. 1 thereof, the preferred embodiment of the new and improved modular steering headset for use on a bicycle embodying the principles and concepts of the present invention and generally designated by the reference number 10 will be described.

The preferred embodiment of the present invention comprises a plurality of components. In their broadest context, such components include cups, raceways, bearing cages, and an adjustment mechanism. Such components are individually configured and correlated with respect to each other to allow a front fork 12 of a bicycle 14 to be rotatably coupled to its frame 16.

Figure 3:
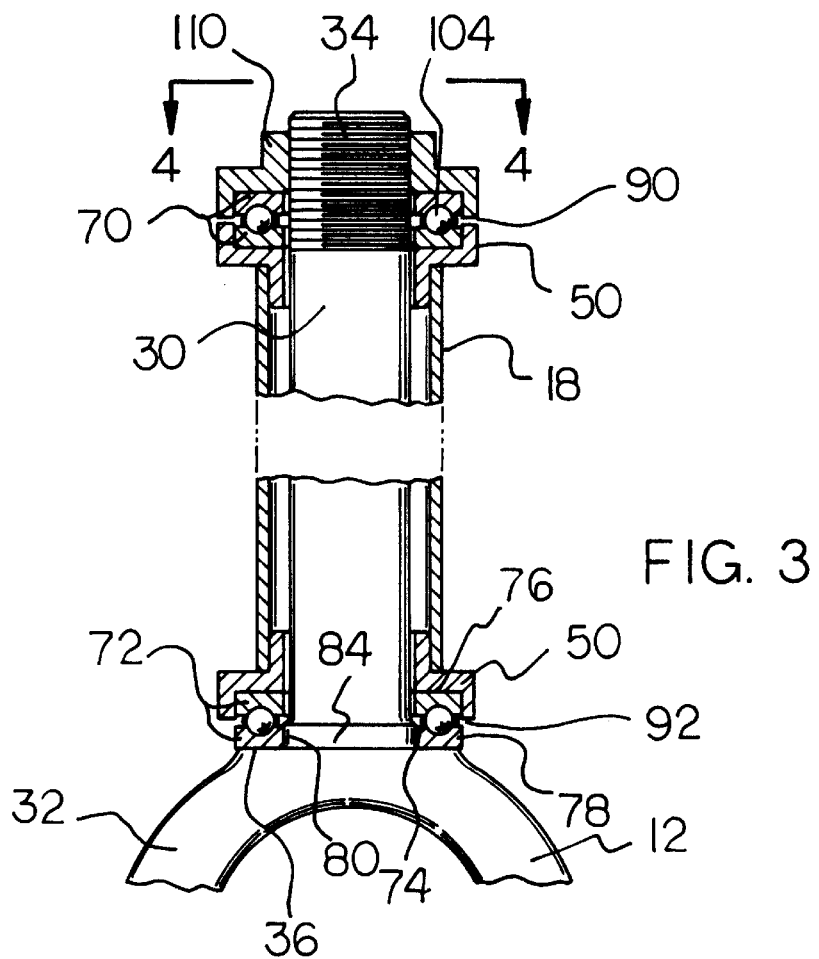
FIG. 3 is a cross-sectional fragmentary view of the preferred embodiment constructed in accordance with the principles of the present invention.

The present invention is adapted to be used with a head tube 18 and front fork 12 on a bicycle. The head tube is formed of a rigid metal material. The head tube is welded or integral with a forward extent of the bicycle frame 16 as shown in FIG. 1. As shown in FIG. 3, the head tube has a central longitudinal axis, and a circular interior cross-section. The head tube has an upper end 20 with an upper opening 21 and an upper end edge 22 bounding the upper opening. Furthermore, the head tube has a lower end 24 with a lower opening 25 and a lower end edge 26 bounding the lower opening. The head tube also has a smooth interior surface 28.

The front fork 12 of the bicycle is formed of a rigid metal. The front fork has a tubular upper extent 30 with a central axis disposed therethrough and a bifurcated lower extent 32. The upper extent is slidably and rotatably inserted within the lower opening 25 on the lower end of the tube and then terminated at a threaded upper end 34. When positioned in this fashion, the central axes of the head tube 18 and the upper extent 30 are aligned. The lower extent 32 has a flat and annular upper abutment edge 36 formed thereon and a pair of spaced and downwardly extending tines 38. The abutment edge is contained in a plane that is orthogonal to the central axis of the upper extent 30. The tines 38 are securable to an axle of a spoked front wheel 40 of the bicycle.

Specifically, the present invention includes a pair of metal cups 50. The cups are formed of a rigid metal material. Each cup has a central axis. In addition, each cup has a tubular inboard portion 52 with a smooth outer surface 54 and a smooth inner surface 56. Each cup has a tubular outboard portion 58 of a diameter greater than that of the inboard portion 52. The outboard portion 58 has a smooth inner surface 60. An annular intermediate portion 62 is extended between the inboard portion 52 and the outboard portion 58. As shown in FIG. 3, each cup has an upper extent with a generally L-shaped cross-section that is integral with a lower extent that has an inverted and generally L-shaped cross-section. One of the cups has its inboard portion 52 fixedly and frictionally press-fit into the upper opening 21 of the head tube 18. The other cup has its inboard portion fixedly and frictionally press-fit into the lower opening 25 of the head tube. When coupled in this manner, the central axes of the cups are aligned with the central axis of the head tube. In addition, the outer surface 54 of each inboard portion 52 of each cup is positioned in facing contact with the interior surface 28 of the head tube. The inner surface 56 of each inboard portion of each cup is placed in facing and spaced opposition to the upper extent 30 of the front fork 12. The intermediate portion 62 of each of the cups is positioned in facing contact with the associated end edges 22, 26 of the head tube 18.

In addition, the present invention includes an upper pair 70 and a lower pair 72 of rigid metal annular raceways. Each raceway has a fixed inner diameter and a fixed outer diameter. Each raceway also has a smooth planar inboard surface 74, a smooth planar outboard surface 76, a smooth outboard edge 78 interconnecting the surfaces 74, 76 at an outer extent thereof, and a smooth inboard edge 80 interconnecting the surfaces at an inner extent thereof. A circular groove 82 with a generally concave cross-section is formed on a central portion of the inboard surface 74. One of the raceways of the lower pair 72 is fixedly and frictionally press-fit around a flange portion 84 on the upper extent 30 of the front fork. Thus, when coupled in this fashion, the raceway is secured to the fork with its outboard surface 76 positioned in facing contact with the abutment edge 36. The other raceway of the lower pair 72 is slidably disposed around the upper extent 30 of the front fork and fixedly and frictionally press-fit within the lower cup 50. When coupled in this manner, the outboard edge 78 and the inboard. surface of the raceway are placed in facing contact with the inboard portion 52 and intermediate portion 62 of the cup. One of the raceways of the upper pair 70 is slidably disposed around the upper extent of the front fork near the threaded end 34 and fixedly and frictionally press-fit within the upper cup. When secured in this fashion, the outboard edge 78 and the inboard surface of this raceway are in facing contact with the inboard portion 52 and intermediate portion 62 of this cup. The other raceway of the upper pair 70 is slidably disposed around the upper extent of the front fork. The inboard surfaces 74 of the pair of upper raceways 70 are positioned in facing opposition to create an upper annular channel 90 therebetween. The inboard surfaces of the pair of lower raceways 72 are positioned in facing opposition to create a lower annular channel 92 therebetween.

The present invention also includes a pair of bearing cages 100. Each bearing cage is formed of a flat rigid metal ring 102. A circular arrangement of rollable and rigid spaced metal bearings 104 are secured to the ring and project outwards therefrom. One of the bearing cages is disposed around the upper extent 30 of the front fork and positioned between the upper pair of raceways 70 with its bearings 102 positioned within the upper channel 90. The other bearing cage is disposed around the upper extent of the front fork and positioned between the lower pair of raceways 74 with its bearings positioned within the lower channel 92.

Figure 4:
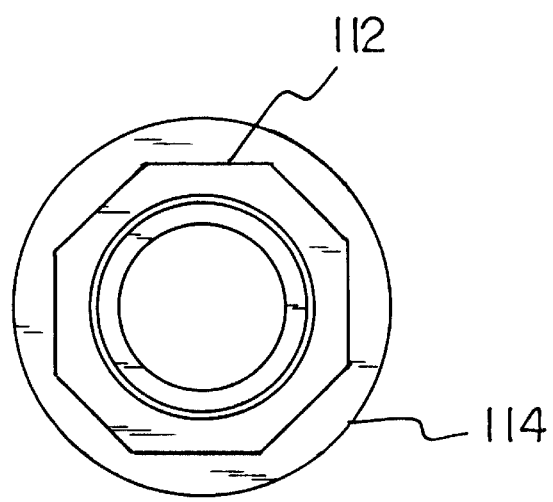
FIG. 4 is an axial view of the preferred embodiment taken along the line 4—4 of FIG. 3.
Figure 5:
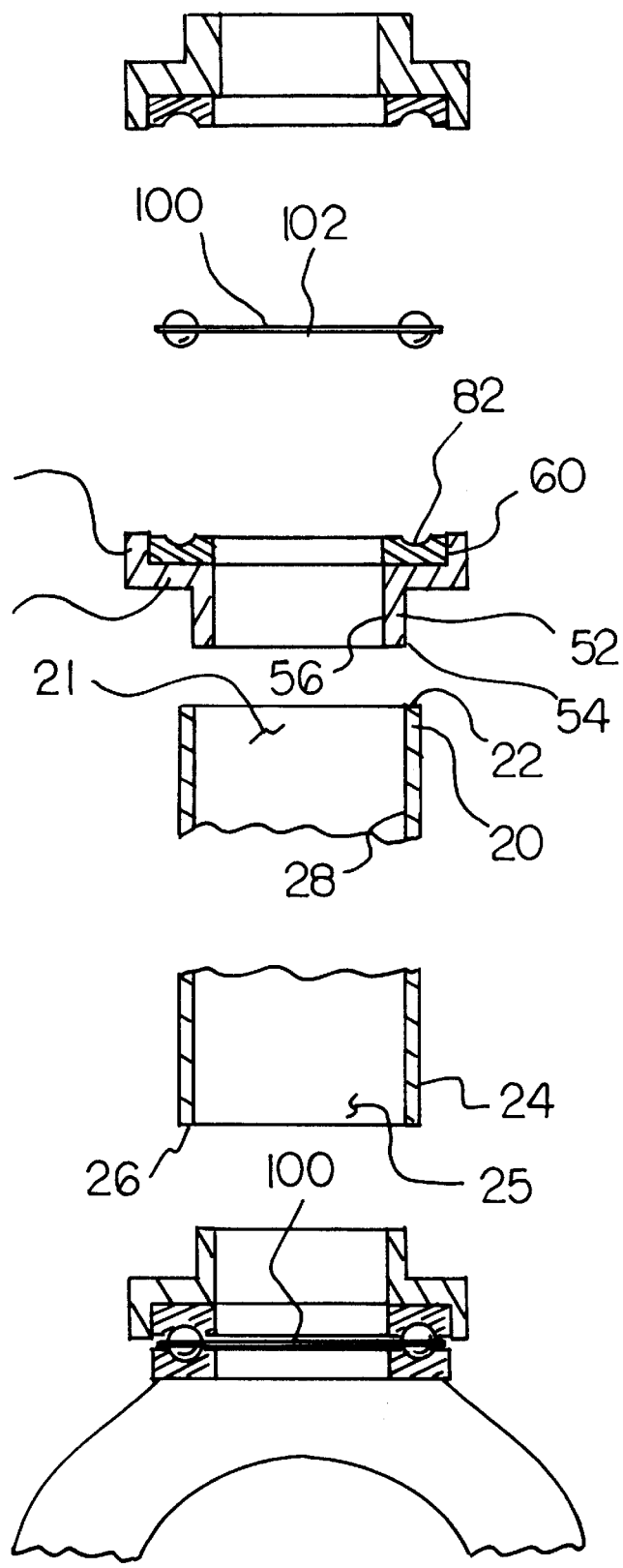
FIG. 5 is an exploded perspective view of the present invention.

Lastly, a rigid metal adjusting nut 110 is threadably coupled to the upper end of the front fork. As shown in FIG. 4, the nut has a tubular upper portion with flat sides 112 to accommodate tightening with a wrench. The nut also has a tubular lower portion 114 of a diameter that is greater than the upper portion. An intermediate portion is extended between the upper portion and the lower portion. The nut has an upper extent with an L-shaped cross-section that is integral with a lower portion having an inverted and generally L-shaped cross-section. The nut is placed in facing contact with the outboard surface 76 of the uppermost raceway of the upper pair 70. The nut is tightened to place the rings 102 of the bearing cages 106 in fixed contact between the associated inboard surfaces 74 of the raceways 70, 72, thereby allowing rollable movement of the bearings 104 within the channels 90, 92 and coupling the front fork 12 to the head tube 18. When coupled in this manner, the fork is axially rotatable with respect to the head tube of the bicycle.

The present invention can be fitted into any existing type of bicycle, including, but not limited to specialized off road bikes such as mountain bikes, road bikes, and freestyle bikes such as "BMX", "Freestyle", and "Mountain Bikes". The headset is conventionally known as that part of the bicycle which locks and secures the front wheel fork into the steering or head tube of the bicycle frame. The present invention generally consists of two roller bearings and a means which to lock the bearings into the head tube and around the head tube, allowing free movement of the fork during steering. The present invention produces dramatic improvements in the strength of the rotatable coupling of the fork within the steering tube, ease of use and adjustment of the coupling, quicker assembly, and enhanced performance and smoothness of the steering.

Figure 2:
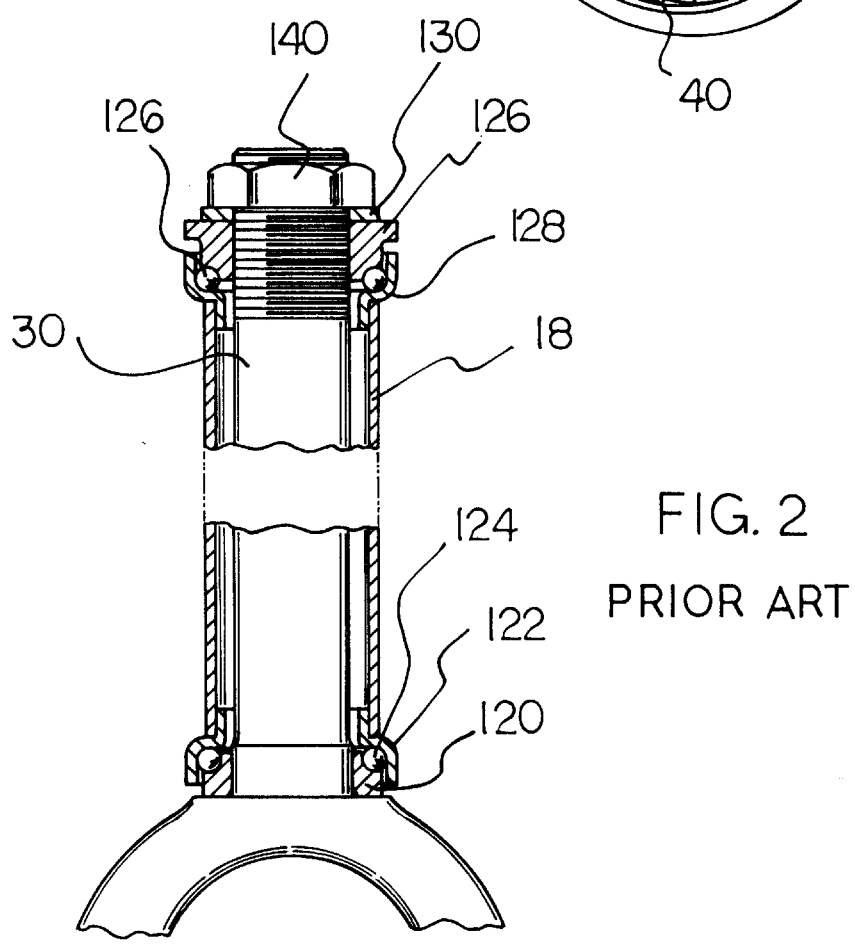
FIG. 2 is a cross-sectional view of a conventional prior art headset for securing a bicycle frame to its associated fork.

The typical head set that is now being used is depicted in FIG. 2. This head set includes a lower bearing raceway 120 which is fitted onto the lower portion of the fork steering tube 30. A cage 122 holds ball bearings 124 in a circular ring about the fork. The ball bearings sit upon a lower bearing raceway. In addition, an upper raceway 126 is fitted into the upper portion of the frame head tube. Another cage 128 with ball bearings 126 are positioned on this raceway. A small spacer 130 is also included and is positioned facing upwards. Next provided is a top nut 140 which threads onto the fork and helps hold the configuration firmly in place after adjustment takes place.

One of the problems associated with the headset structure of FIG. 2 is the time and effort necessary to in adjusting it so that it performs properly. The threaded raceway is tightened down, pulling the fork and lower bearing assembly up into place. However, one cannot over tighten this system as it will bind or break the bearings and/or the cups or raceways. It is necessary to tighten just enough to remove any play into the bearings but not cause drag in the steering movement. Once this point has been found, and this often takes a number of times, tightening and loosening, the top nut is tightened against the spacers and threaded raceway to lock the adjustment in place. Many times the very act of tightening the top nut moves the threaded raceway sending the system out of adjustment and you have to start all over again. In other words, it is very hard to use.

Another problem with these types of typical headsets is their strength is limited by their structure. "BMX", "Freestyle", and "Mountain Bikes" front forks are subjected to a tremendous beating every time they are ridden. As such, the bearings and their raceways absorb all the shocks delivered during riding. The standard headset can be easily damaged, bent out of round or broken during racing or trick riding. They also lose their adjustment quite readily after a short amount of time riding.

The reason for this is twofold. First is the design of the raceways. They type of bearing used is called a retainer bearing. It consists of a cup with an internal concave radius, bounded by the cups sides, a circle of tiny balls loosely captured in a circular cage, and a smaller lower raceway with a ¼ radius (concave) corresponding to the ball's diameter. When the bearing is impacted, as on a jump, the force causes the balls to try to go up and outward to the cups sides. This puts tremendous pressure on the cup walls instead of straight up into the head tube section. This is crucial because, the metal's compressive strength is much greater than it's shear strength. Failure of this system is inevitable because the cups walls are absorbing the majority of the impact instead of the cups base section. This is readily seen in FIG. 2.

The second reason for early failure of the standard headset is the strength of the materials used. The balls used can be easily misshaped or flattened out of round by over tightening and by the impacts it has to endure. The steel is a somewhat mild type of steel and is not of sufficient hardness to resist bending and tearing. Lastly, this system is also rather heavy due to the large number of parts used to hold it together.

The present makes major improvements in all these areas just described. The most notable difference is in its strength and ease of adjustment. The present invention consists of two 7075-T6 aluminum alloy cups into which flat circular raceways are press-fit into the bottom. The cups of the present invention do not have to be aluminum. They can be made of steel, carbon fiber, composites, or any other material of suitable tensile strength. However, the aluminum has economical cost and are easy to machine and fabricate, keeping manufacturing costs down. The raceways have a concave groove formed thereon at a location centered between its Inner Diameter (I.D.) and its Outer Diameter (O.D.). The raceways are formed of 7075-T6 alluminum alloy. The top nut that locks the headset into place is of a special design. First, the thread used is a class 3 thread. Secondly, the fork tube that it threads onto is a class 2 thread. This provides a self locking top nut, which stays wherever you put it. It is important to note that this is not a tapered thread system as is found on sealing pipe threads. It works by providing an extremely close fitting thread pattern. This system acts much like a press-fit dowel pin that is inserted in a hole. This means that the grip is constant anywhere on the fork tube and the grip is a full 360° around the tube as opposed to using a set screw or a plastic strip or patch imbedded in the nut.

Another of the present invention is the ability to "adjust" in damping capabilities. By over torquing the top nut, drag can be induced in degrees to help prevent the handlebars from being jerked out of the rider's hands during severe jolts. The strength of the bearings allows this to happen without damaging them. The amount of drag desired can be selected by the individual rider to suit his/her own needs. The term "over torquing" as used above means that amount of extra torque required to prevent free spinning of the bearing. In other words, it begins where normal adjustment has been reached. Normal adjustment is that point where torque applied allows no radial movement in the assembled headset, but allows effortless movement in the circular path of the fork and handlebars. This is normally achieved at about 25–35 lbs/ft. This system is capable of working at a static load of about three tons.

An aspect of the present invention is the serviceability of the raceways and ball bearing cages. Should damage occur the bearings, a rider has only to remove the circular raceways from their respective alloy (aluminum) cups and press in new ones. It is not necessary to remove the cups from the bike. In the conventional headset, the cups and the raceways would have to be completely replaced. In other words, the rider would have to replace the whole system. This modular concept is a distinct improvement over those presently in use.

To assemble, the two aluminum cups are press-fit into the upper and lower openings of the head tube. Flat raceways are press-fit onto the lower and upper ends of the head tube. A raceway and ball bearing cage is then set on the fork. The upper end of the fork steering tube is inserted into the head tube such that the lowermost raceways face each other with the bearing cage held therebetween. Another raceway and ball bearing cage is placed on the upper raceway on the head tube in opposition to the associated raceway on the upper end of the head tube. A threaded lock nut/raceway part is then threaded onto the fork steering tube and tightened as hard as possible. The center grooves in the raceways align with each other via the ball bearings and the steering tube automatically centers itself in the head tube.

No other adjustment is necessary. In fact, no matter how hard the nut is tightened, the bearings will not bind up or drag. The torque used to keep the bearings in place contributes to its tremendous radial strength. The cups merely serve to hold the race ways in place. The centered grooves in the raceways direct the force acting on the fork directly upward into the head tube.

The bearings cages used are actually are high load and high speed machinery bearing cages. Their strength comes from the fact that they are made of 5100 high carbon steel and have a hardness of 60 64 Rockwell c. They have a load rating of 5,400 lbs/sq. in. dynamic and around 8,000 lbs/sq. in. static. Also, the ball bearings of the bearing cages are larger in diameter. The 7075-T6 aluminum alloy cups and lock nut have a tensile strength of 79,000 lbs./sq. in. (yield). The use of the aluminum gives our headset a weight savings of about 2–4 oz. compared to the steel headset described earlier. It should be noted here that bearing cages have been in use for a long time on machinery. However, our use of this bearing type in a bicycle steering system is a new innovation. The use of a high strength, high torque lock nut is also unique to this application. There are other bearing systems used, such as a tapered needle bearing, but their setup and design has no resemblance to the present invention and can also fatigue somewhat quickly.

In summary, the present invention provides the following major improvements:

1. Tremendous strength and impact resistance. Forces are directed straight up the head tube and not to the sides.
2. No adjustments are required. Simply tighten down lock not. No fine tuning is required. This is a tremendous time saver.
3. Extremely smooth, bind free operation.
4. Lighter weight using high strength aluminum alloys and minimal steel components.

Lastly, it is of importance to note that our new headset is a unique combination of many concepts brought together to produce a vastly improved system. Each part is necessary to make the whole work properly. There is a synergistic relationship among all of the components involved. Any attempt to substitute conventional bearings, cups, etc., and combine with the new parts described would result in inevitable failure. Each part depends on the other parts to make the whole headset work properly.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A modular steering headset for allowing a front fork of a bicycle frame to be rotatably coupled to a frame comprising, in combination:

a rigid metal head tube securable to a forward extent of the bicycle frame, the head tube having a central longitudinal axis, a circular interior cross section, an upper end with an upper opening, an upper end edge bounding the upper opening, a lower end with a lower opening, a lower end edge bounding the lower opening, and a smooth interior surface;

a rigid metal front fork having a tubular upper extent and a bifurcated lower extent with the upper extent slidably rotatably inserted within the lower end of the tube and terminated at a threaded upper end and with the lower extent having a flat annular upper abutment edge formed thereon and a pair of spaced and downwardly extending tines that are securable to a front wheel of the bicycle, wherein the abutment edge is contained in a plane that is orthogonal to a central axis of the upper extent;

a pair of rigid metal cups, each cup having a central axis, a tubular inboard portion with a smooth outer surface and a smooth inboard surface, a tubular outboard portion of a diameter greater than that of the inboard portion and having a smooth inner surface, and an annular intermediate portion perpendicularly extended therebetween, each cup having an upper extent with an L-shaped cross-section integral with a lower extent having an inverted L-shaped cross-section, and with one of the cups having its inboard portion fixedly press-fit into the upper opening of the head tube and the other cup having its inboard portion fixedly press-fit into the lower opening of the head tube, and wherein the central axes of the cups are aligned with the central axis of the head tube, the outer surface of each inboard portion of each cup is positioned in facing contact with the inner surface of the head tube, the outer surface of each cup is in facing spaced opposition to the upper extent of the front fork, and the intermediate portion of each of the cups is positioned in facing contact with the associated end edge of the head tube;

an upper pair and a lower pair of rigid metal annular raceways, each raceway having a fixed inner diameter, a fixed outer diameter, a smooth planar inboard surface, a smooth planar outboard surface, a smooth outboard edge interconnecting the surface at an outer extent thereof, a smooth inboard edge interconnection the surfaces at an inner extent thereof, and a circular groove with a concave cross section formed on a central potion of the inboard surface, wherein one of the raceways of the lower pair is fixedly press-fit around the upper extent of the front fork with its outboard surface positioned in facing contact with the abutment edge and the other raceway of the lower pair is slidably disposed around the upper extent of the front fork and fixedly press-fit within a lower cup, and wherein one of the raceways of the upper pair is slidably disposed around the upper extent of the front fork and press-fit within an upper cup and the other raceway of the upper pair is slidably disposed around the upper extent of the front fork, and wherein the inboard surfaces of the upper raceways are positioned in facing opposition to create an upper annular channel therebetween and the inboard surface of the lower raceways are positioned in facing opposition to create a lower annular channel therebetween;

a pair of bearing cages, each bearing cage formed of a flat rigid metal ring with a circular arrangement of rollable rigid spaced metal ball bearings secured thereto and projection outwards therefrom and with one of the bearing cages disposed around the upper extent of the front fork and positioned between the upper pair of raceways with its bearing positioned within the upper channel, and with the other bearing cage disposed around the upper extent of the front fork and positioned within the lower pair of raceways with its bearings positioned within the lower channel; and a rigid metal adjusting nut threadably coupled to the upper end of the front fork, the nut having a tubular upper portion, a tubular lower portion of a diameter greater than the upper portion, and an intermediate portion perpendicularly extended therebetween, the nut having an upper extent with an L-shaped cross-section integral with a lower portion having an inverted L-shaped cross-section, and with the nut placed in facing contact with the outboard surface of the uppermost raceway of the upper pair and tightened to place the rings of the bearing cages in contact between the associated inboard surfaces of the raceways thereby allowing rollable movement of the bearings within the channels and rotatably coupling the front fork to the head tube wherein each cup's L-shaped cross-section fully supports the entire underside surface of one of each pair of annular raceways, where each said underside surface lies in a plane orthogonal to a longitudinal axis of the head tube.

\* \* \* \* \*